(12) United States Patent
Zhan

(10) Patent No.: US 8,910,566 B2
(45) Date of Patent: Dec. 16, 2014

(54) GRILLING DEVICE

(75) Inventor: Yixin Zhan, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 287 days.

(21) Appl. No.: 13/298,624

(22) Filed: Nov. 17, 2011

(65) Prior Publication Data

US 2012/0118173 A1  May 17, 2012

(30) Foreign Application Priority Data

Nov. 17, 2010  (CN) .................. 2010 2 0612993 U

(51) Int. Cl.
*A47J 37/06* (2006.01)

(52) U.S. Cl.
CPC .................. *A47J 37/0611* (2013.01)
USPC .................... 99/375; 99/376; 99/377; 99/372

(58) Field of Classification Search
USPC ........... 99/372, 373, 374, 375, 376, 377, 378, 99/379, 380, 425, 446, 445
See application file for complete search history.

(56) References Cited

U.S. PATENT DOCUMENTS

| | | | | | |
|---|---|---|---|---|---|
| 2,772,627 | A | * | 12/1956 | Newell | 99/425 |
| 3,010,383 | A | * | 11/1961 | Greene | 99/332 |
| 3,664,256 | A | * | 5/1972 | Peirce | 99/425 |
| 5,845,562 | A | * | 12/1998 | Deni et al. | 99/375 |
| 5,848,567 | A | * | 12/1998 | Chiang | 99/375 |

* cited by examiner

*Primary Examiner* — Reginald L Alexander
(74) *Attorney, Agent, or Firm* — Rabin & Berdo, P.C.

(57) ABSTRACT

A grilling device comprises an upper shell and a lower shell, an upper pan disposed on the lower surface of the upper pan and a lower pan disposed on the top surface of the lower shell, and electric heating tubes disposed on the rear sides of the pans, wherein the top surface of the lower pan is slant from two sides to the middle portion, and the shape of the lower surface of the upper pan is cooperated with the shape of the top surface of the lower pan. When cooking, the oil will flow to the middle and will be discharged out from the opening in the middle. The steam can be discharged from two sides because the pan is lower in middle and higher in two sides. Steam is prevented from being discharged from front side. The arc surface has more cooking surface in the same size.

9 Claims, 2 Drawing Sheets

GRILLING DEVICE

FIELD OF THE INVENTION

The present invention relates to a grilling device, more particularly, to a grilling device with arc pans.

BACKGROUND OF THE INVENTION

Generally, the grilling devices comprise an upper shell and a lower shell, a upper pan disposed on the lower surface of the upper pan and a lower pan disposed on the top surface of the lower shell. The grilling usually are used for cooking food with much oil such as meat, much oil will be produced in cooking, and the oil must be discharged from the pan timely, or else the oil will affect the taste of the cooked food. Commonly, an oil discharging opening is set in the front side of the pan of the grilling device, and an oil box is disposed under the pan for collecting the oil. Pans of the grilling device are plane or a little slant, thus the oil can flow into the oil box.

However, the above grilling device have the following disadvantages: firstly, because the pan is plane, the oil discharge speed is slow and the oil is stayed in the grilling device for too long, thus affect the taste of the cooked food; secondly, in cooking, the steam may be discharged from the front side, thus the users may be burned by the steam; thirdly, a plane pan has smaller cooking surface in same size of the grilling device.

SUMMARY OF THE INVENTION

The primary object of the present invention is to provide a grilling device with double arc surfaces to solute the problem in above.

This and other objects are achieved by providing:

A grilling devices comprise an upper shell and a lower shell, an upper pan disposed on the lower surface of the upper pan and a lower pan disposed on the top surface of the lower shell, and electric heating tubes disposed on the back of the pans, wherein the top surface of the lower pan is slant from two sides to the middle portion, and the shape of the lower surface of the upper pan is cooperated with the shape of the top surface of the lower pan.

In a preferred embodiment of the present invention, the top surface of the lower pan are two slant surfaces or arc surfaces which are symmetrical from left to right side.

In a preferred embodiment of the present invention, said surfaces of the pans are smooth surfaces or wave surfaces with ribs.

In a preferred embodiment of the present invention, the top surface of said lower pan are two arc surfaces which are symmetrical from left to right side, the two arc surface are connected to be a continuous arc surface or a discontinuous arc surface.

In a preferred embodiment of the present invention, an oil collecting groove is disposed on the middle of the pan, and an oil box for collecting the oil corresponding to the oil collecting groove is disposed under the pan.

The grilling device of the present invention has arc pan surface, thus in cooking the oil will flow to the middle and discharged out from the opening in the middle; and the temperature of the pan is high, which can prevent the oil being cooled, and the oil can be discharged to the oil box from the middle smoothly. Because the pan is lower in middle and higher in two sides, the steam can be discharged from two sides, thus can prevent the steam being discharged from front side to burn the users. and the arc surface has more cooking surface in same size. and food with arc shape such as ribs can be cooked well on the arc pan.

BRIEF DESCRIPTION OF THE DRAWINGS

FIG. 2 is a front view of the lower pan of the present invention.

DETAILED DESCRIPTION OF PREFERRED EMBODIMENTS

Figure 1:
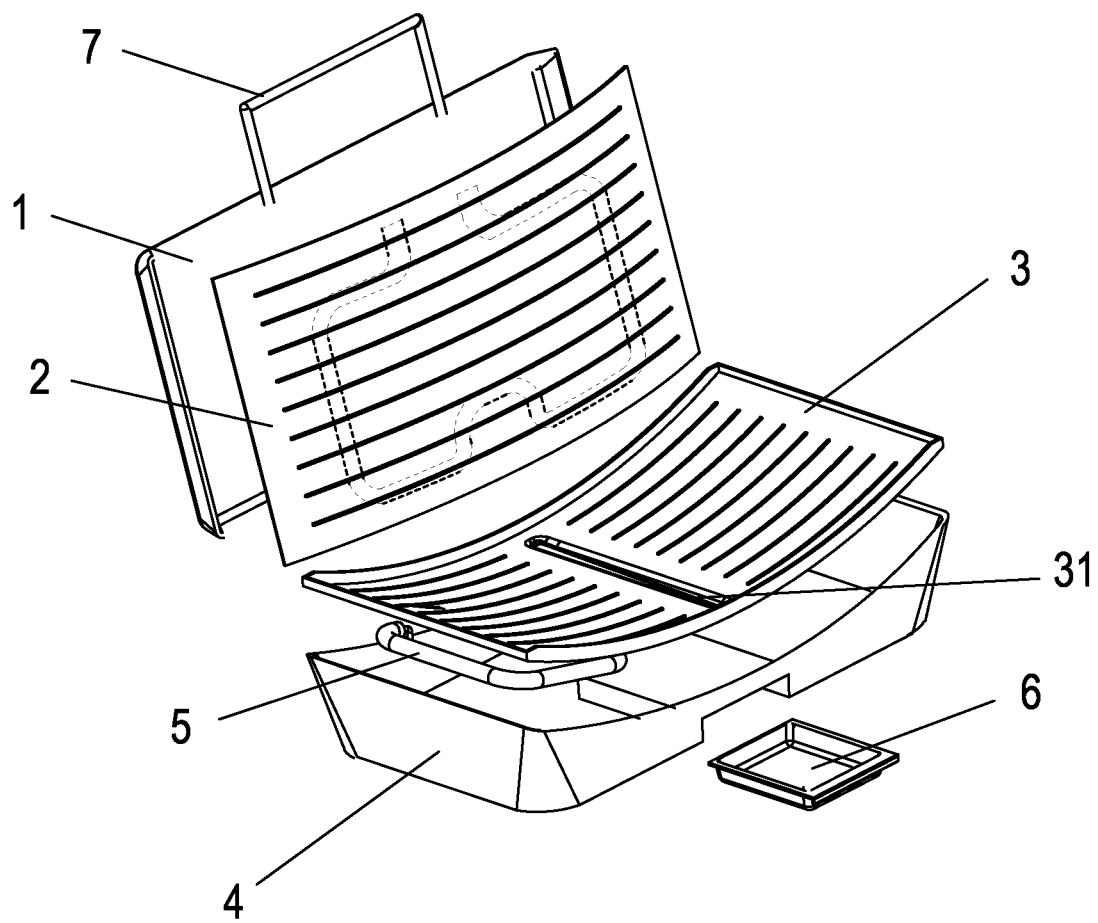
FIG. 1 is an exploded view of the present invention.
Figure 2:
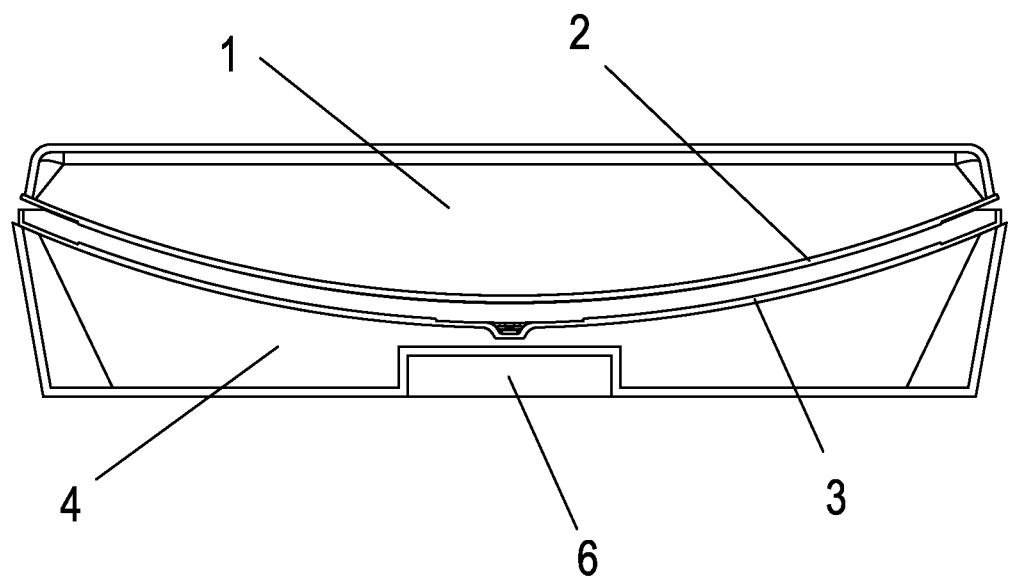
FIG. 2 is a front view of the present invention.
Figure 3:
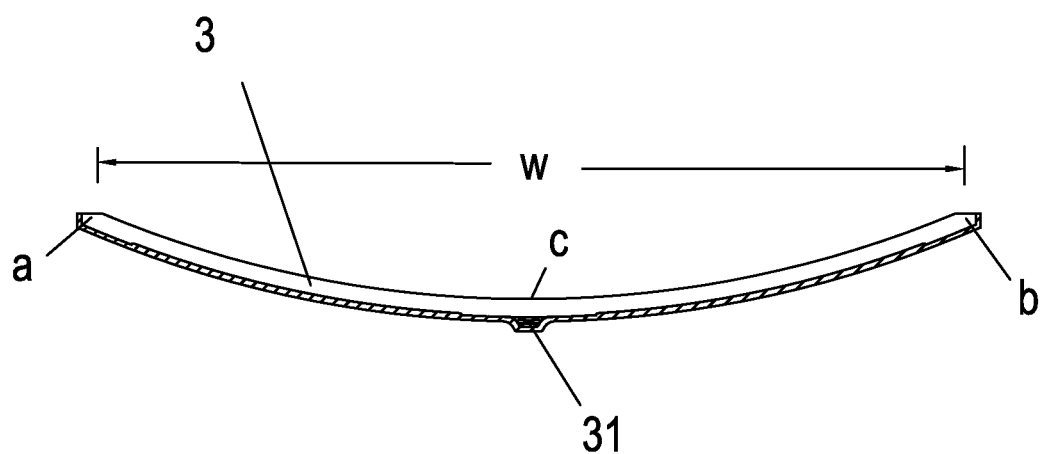

Referring to FIG. 1 to FIG. 3, the grilling device of the present invention comprises an upper shell 1 and a lower shell 4, an upper pan 2 disposed on the lower surface of the upper shell 1 and a lower pan 3 disposed on the top surface of the lower shell 4. the rear side of the upper shell 1 and the rear side of the lower shell 3 are connected pivotally and form a rotating connection. The front side of the upper shell 1 has a handle 7, and an electric heating tube 5 for heating the pan 3 is disposed under the lower pan 3.

The top surface of the lower pan 3 is a double-arc surface symmetrical from left side to right side, and the surface is tiled from the both left side and the right side to the middle. Referring to FIG. 3, the left portion of the surface has an arc a-c, the right portion of the surface has an arc c-b, and the arc a-c and the arc c-b form a continuous bigger arc a-c-b. Referring to FIG. 1, the surface of the lower pan 3 is a wave surface with ribs, and the ribs are extended along the direction of left-right, so in cooking, the oil can flow to the oil collecting groove 31 in the middle along the grooves between the ribs. An opening connecting the oil box 6 is disposed in the front side of the oil groove. The oil box 6 is a square shape and is removably connected on the bottom of the lower shell 4 near the front side. And the bottom surface of the upper pan 2 is corresponding to the top surface of the lower pan 3.

The grilling device of the present invention has arc pan surface, thus in cooking the oil will flow to the middle and discharged out from the opening in the middle; and the temperature of the pan is high, which can prevent the oil being cooled, and the oil can be discharged to the oil box from the middle smoothly. Because the pan is lower in middle and higher in two sides, the steam can be discharged from two sides, thus can prevent the steam being discharged from front side to burn the users. And the arc surface has more cooking surface in same size W. and food with arc shape such as ribs can be cooked well on the arc pan.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with detailed description, but rather by the claims appended hereto.

What is claimed is:
1. A grilling device comprising:
an upper shell, having a lower surface,
a lower shell, having a top surface and a lower surface,
an upper pan disposed on the lower surface of the upper shell, having a first symmetrical arcuate shape, an upper surface, and a lower surface,
a lower pan disposed on the top surface of the lower shell, having a second symmetrical arcuate shape, a top surface, a lower surface, two sides and a middle portion, and electric heating tubes mounted above the upper surface of the upper pan and below the lower surface of the lower pan, wherein the first symmetrical arcuate shape of the lower surface of the upper pan corresponds with the second symmetrical arcuate shape of the top surface of the lower pan and, wherein an oil collecting groove is disposed on the middle portion of the lower pan, and an oil box corresponding to the oil collecting groove is disposed under the lower pan.

2. The grilling device according to claim 1, wherein the top surface of the lower pan further comprises two slant or arc surfaces, which are symmetrical to each other.

3. The grilling device according to claim 1, wherein the lower surface of the upper pan and the top surface of the lower pan are smooth surfaces.

4. The grilling device according to claim 1, wherein the top surface of the lower pan further comprises two arc surfaces, which are symmetrical to each other, the two arc surfaces are connected to form a continuous arc surface.

5. The grilling device according to claim 2, wherein the lower surface of the upper pan and the top surface of the lower pan are smooth surfaces.

6. The grilling device according to claim 2, wherein the top surface of the lower pan further comprises two arc surfaces, which are symmetrical to each other, the two arc surfaces are connected to form a continuous arc surface.

7. The grilling device according to claim 1, wherein each of the two sides of the lower pan has an arc shape, the arc shapes of the two sides are symmetrical to each other with respect to the middle portion of the lower pan.

8. The grilling device according to claim 1, wherein the lower surface of the upper pan and the top surface of the lower pan are wave surfaces with ribs.

9. The grilling device according to claim 2, wherein the lower surface of the upper pan and the top surface of the lower pan are wave surfaces with ribs.

* * * * *